United States Patent
Bolleter et al.

(10) Patent No.: US 11,457,997 B2
(45) Date of Patent: Oct. 4, 2022

(54) DENTAL PROSTHESIS SYSTEM

(71) Applicant: DENTALPOINT AG, Zürich (CH)

(72) Inventors: Philip Bolleter, Schlieren (CH); Pascal Wettstein, Unterkulm (CH)

(73) Assignee: DENTALPOINT AG, Zürich (CH)

( * ) Notice: Subject to any disclaimer, the term of this patent is extended or adjusted under 35 U.S.C. 154(b) by 65 days.

(21) Appl. No.: 16/326,101

(22) PCT Filed: Mar. 20, 2017

(86) PCT No.: PCT/EP2017/056542
§ 371 (c)(1),
(2) Date: Feb. 15, 2019

(87) PCT Pub. No.: WO2018/046148
PCT Pub. Date: Mar. 15, 2018

(65) Prior Publication Data
US 2019/0183613 A1 Jun. 20, 2019

(30) Foreign Application Priority Data
Sep. 8, 2016 (CH) .......................... 1170/16

(51) Int. Cl.
A61C 8/00 (2006.01)
(52) U.S. Cl.
CPC .......... A61C 8/0068 (2013.01); A61C 8/0012 (2013.01); A61C 8/0016 (2013.01);
(Continued)
(58) Field of Classification Search
CPC ... A61C 8/0068; A61C 8/0012; A61C 8/0016; A61C 8/0066; A61C 8/0069; A61C 8/0057; A61C 8/0059
See application file for complete search history.

(56) References Cited

U.S. PATENT DOCUMENTS 7,942,670 B2    5/2011   Marley
8,038,442 B2 *  10/2011  Hurson ................ A61C 8/0022
                                                        433/173
(Continued)

FOREIGN PATENT DOCUMENTS

DE    299 21 193 U1    4/2001
EP    0 535 190 A1     4/1993
(Continued)

OTHER PUBLICATIONS

Merriam-Webster; Transition fit; https://www.merriam-webster.com/dictionary/transition%20fit; Feb. 26, 2021.*

Primary Examiner — Heidi M Eide
Assistant Examiner — Drew S Folgmann
(74) Attorney, Agent, or Firm — Pauley Erickson & Swanson

(57) ABSTRACT

A ceramic dental prosthesis including an implant for osseointegration in a jaw bone with a receiving opening and an abutment having a through-hole for receiving a bolt. The bolt is produced from a fiber-reinforced thermoplastic and connects the abutment and the implant. The dental prosthesis system includes an anti-rotation feature formed by a first interlocking means arranged on a proximal end of the abutment and a second interlocking means arranged on a distal end of the implant. The first interlocking means engages in the second interlocking means, wherein the first and second interlocking means are arranged at a distance from one another such that the abutment can be tilted relative to the implant. The bolt runs in the through-hole of the abutment and the receiving opening. An interference fit is provided between the bolt and the receiving opening of the implant.

15 Claims, 4 Drawing Sheets

(52) U.S. Cl.
CPC .......... *A61C 8/0066* (2013.01); *A61C 8/0069* (2013.01); *A61C 8/0057* (2013.01); *A61C 8/0059* (2013.01)

(56) References Cited

U.S. PATENT DOCUMENTS

| | | |
|---|---|---|
| 2003/0224330 A1 | 12/2003 | Aravena et al. |
| 2003/0224331 A1 | 12/2003 | Kumar et al. |
| 2006/0216672 A1 | 9/2006 | Dinkelacker |
| 2008/0286721 A1 | 11/2008 | Walther |
| 2009/0111072 A1 | 4/2009 | Lombardo et al. |
| 2009/0123888 A1 | 5/2009 | Rosenberg |
| 2011/0020768 A1* | 1/2011 | Spagnoli ................ A61C 8/008 433/174 |
| 2012/0219928 A1 | 8/2012 | Abboud |
| 2012/0288825 A1 | 11/2012 | Nordin et al. |
| 2014/0147808 A1* | 5/2014 | Buurlage ............. A61C 8/0012 433/173 |
| 2014/0272791 A1* | 9/2014 | Sanchez ............... A61C 8/0054 433/173 |
| 2015/0072309 A1* | 3/2015 | Wen ....................... A61C 8/006 433/173 |
| 2015/0132717 A1 | 5/2015 | Seo et al. |
| 2015/0147721 A1 | 5/2015 | Costa Codina |
| 2015/0147724 A1 | 5/2015 | Staudenmann et al. |
| 2018/0147030 A1 | 5/2018 | Bolleter et al. |

FOREIGN PATENT DOCUMENTS

| | | |
|---|---|---|
| EP | 2 143 398 A1 | 1/2010 |
| EP | 2 522 300 A1 | 11/2012 |
| WO | WO 92/18780 A1 | 10/1992 |
| WO | WO 2004/032786 A1 | 4/2004 |
| WO | WO 2014/091346 A9 | 6/2014 |
| WO | WO 2016/006730 A1 | 1/2016 |
| WO | WO 2016/198385 A1 | 12/2016 |

* cited by examiner

DENTAL PROSTHESIS SYSTEM

BACKGROUND OF THE INVENTION

Field of the Invention

The invention relates to a dental prosthesis system.

Discussion of Related Art

In dental implantology, systems made of titanium are still mainly used. These systems generally consist of an implant, which is anchored in the bone, an abutment for receiving the dental crown, and a connecting screw, with all three elements being produced from titanium or a suitable titanium alloy. The abutment has a through-bore which is configured to receive the connecting screw in order to fix the abutment in the implant using the connecting screw. The abutment generally comprises an abutment head and an abutment stem. The through-bore extends through head and stem. At its distal end, the implant has an opening, for example in the form of a blind bore, which receives the abutment stem and the connecting screw. An inner thread is generally arranged in this opening. For fixing the abutment in the implant, the abutment is first of all positioned in the implant, and the connecting screw is guided through the through-bore and tightened. To position the abutment in the implant, it is known to provide an anti-rotation arrangement on the abutment stem, for example to configure the outer circumferential surface of the abutment stem as a polygon which engages in a corresponding inner polygon in the implant opening. The abutment or the abutment stem is in this way positioned in a rotationally stable manner in the implant and thereafter fixed using the connecting screw.

This connection of the abutment to the implant has proven effective in dental prosthesis systems in which all parts are produced from titanium or titanium alloys. The ductile behavior and plastic deformability of the titanium or of the titanium alloys makes it possible to take up flexural loads of the kind that act on the dental crown and on the underlying abutment during mastication. A sealing action, in particular between abutment and implant, is at least partially ensured by this material behavior. This applies in particular for the tensile forces and compressive forces that occur. In dental prosthesis systems known from the prior art, the abutment stem has a certain length such that it extends quite far into the receiving opening of the implant. The abutment is thus secured against tilting. Taking this connection of dental prosthesis systems made of titanium and transposing it to an abutment and an implant made of ceramic has proven difficult. As described above, the abutment stem and the connecting screw of a dental prosthesis system made of titanium extend into the opening of the implant. The wall thickness of the implant is correspondingly reduced, since the opening in the implant has to receive the abutment stem together with the screw. In view of the anatomical circumstances presented by the human jaw, it is desirable to have an implant diameter of 5 mm or less. In the case of titanium implants, compared to ceramic implants, small wall thicknesses play a much less important role as regards stability. In the case of ceramics, excessively small wall thicknesses of the implant and/or of the abutment very easily lead to fracturing of the dental prosthesis system. In addition, compared to the systems made of titanium, the tensile forces that result during mastication (flexural loading) can be taken up only to a very limited extent by ceramic. Moreover, in a dental prosthesis system made of ceramic, the sealing between abutment and implant is more difficult to achieve than in systems made of titanium.

The use of ceramic materials instead of metal has long been known in dental prosthesis systems, likewise the screwing of the abutment to the implant. As an example of dental prosthesis systems made of ceramic that are known from the prior art, reference is made here to WO 2014/091346.

SUMMARY OF THE INVENTION

It is an object of the invention to make available a dental prosthesis system that at least partially avoids the disadvantages of known solutions.

The dental prosthesis system according to the invention is distinguished in particular by a high degree of stability with respect to flexural loads, which can occur especially during mastication. The sealing between the implant and the abutment, which are produced from ceramic according to the invention, is likewise improved.

In the context of the present invention, so-called "bone level" implants are understood as a dental prosthesis system having an implant which, in the inserted state, does not protrude, or protrudes only very slightly, above the height of the bone level of the jaw bone. This is in contrast to the so-called "tissue level" implant which, at its distal end, has a circumferential edge of the so-called implant neck which, in the inserted state, always extends above the bone level of the jaw bone.

Where mention is made below of an implant, the latter comprises the part of the dental prosthesis system anchored in the jaw bone. The abutment is a part separate from the implant. The abutment serves later to receive the dental crown. It is placed onto the implant and is secured in the implant with a bolt.

An interference fit is to be understood as meaning that the maximum size of the diameter of the receiving opening of the implant is, at least in subregions, in each case smaller than the minimum size of the diameter of the bolt. The interference fit comprises a tolerance range of 0 to 0.1 mm, preferably 0.02 to 0.05 mm.

A clearance fit is to be understood as meaning that the minimum size of the diameter of the receiving opening of the implant is, at least in subregions, always greater than or at least the same as the maximum size of the diameter of the bolt. The clearance fit comprises a tolerance range of 0 to 0.1 mm, preferably 0.01 to 0.05 mm.

The dental prosthesis system according to the invention is produced from ceramic and comprises an implant designed for osseointegration in a jaw bone and having a receiving opening, and an abutment having a through-bore for receiving a bolt. The bolt is produced from a fiber-reinforced thermoplastic and is configured to connect abutment and implant. Moreover, the dental prosthesis system according to the invention has an anti-rotation arrangement provided by first form-fit means arranged at a proximal end of the abutment and second form-fit means arranged at a distal end of the implant. The dental prosthesis system is characterized in that, when the first form-fit means engage in the second form-fit means, the first and second form-fit means are arranged at a distance from each other, such that the abutment is tiltable relative to the implant. The inserted bolt extends in the through-bore of the abutment and the receiving opening. An interference fit is provided between the bolt and the receiving opening of the implant.

In a first embodiment, the proximal end of the abutment and the distal end of the implant each have a bearing surface.

The first and second form-fit means are arranged at the bearing surfaces. The bearing surfaces touch each other when the first form-fit means engage in the second form-fit means.

In one embodiment, the two bearing surfaces have a flat cone design, inclined at a uniform angle.

In a further embodiment, the two bearing surfaces have a rounded configuration in the contact region, wherein the radius of the rounding of the two bearing surfaces has the same value.

In one embodiment, the bolt has at least a first cylinder portion and, seen in the proximal direction, a second cylinder portion adjoining the first cylinder portion, wherein the diameter of the first cylinder portion is greater than the diameter of the receiving opening of the implant, such that an interference fit results between the first cylinder portion and the receiving opening of the implant.

In a preferred embodiment, at the transition between the first and the second cylinder portion, a circumferential shoulder is provided which bears on a circumferential projection arranged in the receiving opening of the implant, wherein the interference fit results between the shoulder and the circumferential projection.

In one embodiment, the second cylinder portion has, on its lateral surface, an outer thread which corresponds to an inner thread arranged in the receiving opening, wherein the root diameter of the outer thread is smaller than or the same as the root diameter of the inner thread.

In one embodiment, the second cylinder portion is adjoined by a further, third cylinder portion, wherein the diameter of the third cylinder portion is smaller than or the same as the diameter of the receiving opening of the implant.

In one embodiment, the first form-fit means comprise a plurality of tabs which project from the bearing surface of the abutment and correspond to the second form-fit means, a plurality of grooves arranged on the bearing surface of the implant.

In a further embodiment, the first form-fit means comprise a plurality of grooves which are arranged on the bearing surface of the abutment and correspond to the second form-fit means, a plurality of tabs which project from the bearing surface of the implant.

In one embodiment, the tabs have lengthwise and widthwise tab walls, preferably one lengthwise tab wall and two widthwise tab walls, and the grooves have widthwise and lengthwise groove walls, preferably one lengthwise groove wall and two widthwise groove walls. When the first form-fit means engage in the second form-fit means, the lengthwise tab wall and the lengthwise groove wall are arranged at a distance from each other, and this distance is greater than the distance between the widthwise tab walls and the widthwise groove walls, such that the abutment can be positioned in a rotationally stable manner in the implant and is tiltable relative to the implant.

In one embodiment, the number of tabs is smaller than the number of grooves, preferably two tabs with four grooves, or two tabs with six grooves, or three tabs with six grooves forming a form-fit connection.

In one embodiment, the fiber-reinforced thermoplastic is a thermoplastic having reinforcement fibers chosen from a group composed of: carbon fiber, aramid fiber, glass fiber, carbon nanotubes, or combinations thereof.

In one embodiment, the fiber-reinforced thermoplastic is composed of unidirectional carbon fibers in a PEEK matrix.

Through the use of the bolt, it is possible, in the dental prosthesis system according to the invention, to do without an abutment with an abutment stem, for example one configured as a tubular hollow body. The inner bore in the implant for receiving the bolt can be configured with a smaller diameter, and the resulting wall thickness of the implant is correspondingly greater. To be able to position the abutment in a rotationally stable manner in the implant before it is fastened using the bolt, the proximal end of the abutment has first form-fit means which interact with the second form-fit means arranged at the distal end of the implant. The interaction of the form-fit means is configured such that the abutment can be secured in a rotationally stable manner in the implant.

In order to achieve the rotational stability, parts of the first and second form-fit means provide an exact form-fit connection, and further parts of the first and second form-fit means are arranged at a certain distance from each other. There is play between the two form-fit means. That is to say, when the abutment is placed onto the implant, the first form-fit means are arranged at a certain distance from the second form-fit means, and the abutment is freely tiltable relative to the implant. This distance or this play is maintained even when the bolt is inserted and the dental prosthesis system is mounted fixedly in the jaw of the patient. This has the effect that, with the bolt inserted, the flexural load (e.g. caused by mastication) can be reliably taken up via the bolt and there is no possibility of the form-fit means jamming. A fracturing of the form-fit means, produced from ceramic, is prevented.

The actual fastening and aligning of the abutment in the implant take place with the aid of the bolt. When the bolt is pretensioned, the proximal end of the abutment is pressed against the distal end of the implant. Abutment and implant are formed from a ceramic material, for example zirconium oxide stabilized with yttrium oxide or with aluminum oxide. The implant and the abutment take up the compressive forces that arise. According to the invention, the bearing surface of the proximal end of the abutment and of the distal end of the implant is available for this purpose. On account of the through-bore of the abutment and the receiving opening of the implant, the bearing surface is in each case an annular bearing surface. The tensile forces that result during flexural loading (e.g. caused by mastication) are absorbed by the bolt and not by the implant and abutment. Since it is produced from a fiber-reinforced thermoplastic, the bolt is elastically deformable and therefore advantageous for absorbing these forces. The ceramic implant and the ceramic abutment are therefore subjected only to pressure and not to tensile force. With the arrangement according to the invention, the tensile forces, which can only be taken up insufficiently by a ceramic material and considerably increase the tendency to fractures, can be led off via the bolt.

The bolt is produced from a soft material with tensile strength, for example a fiber-reinforced thermoplastic. Production from such a material affords the possibility of producing the bolt, or at least parts of the bolt, with an oversize, such that an interference fit is present between the receiving opening of the implant and the bolt.

The oversize results in an interference fit in partial regions between the bolt and the receiving opening. This interference fit makes it possible to seal off cavities which are present in further partial regions where there is no interference fit. This sealing ensures that bacteria, for example, cannot gather in the interior of the implant.

Further advantages of the bolt made from fiber-reinforced thermoplastic are its damping properties and its ability to take up and carry off sudden jolts caused by overloading. To put it simply, the bolt in the dental prosthesis system according to the invention acts as a kind of shock absorber.

This is especially important when brittle materials, e.g. ceramic, are used for implant and abutment, since these materials have no damping properties on account of the lack of elastic and plastic deformability.

In a further embodiment of the dental prosthesis system according to the invention, a stop element is arranged on the bolt and/or on an inner wall of the through-bore of the abutment. The bolt latches temporarily in the stop element in a pre-assembly position.

This pre-assembly position is attained by the dentist introducing the bolt into the through-bore of the abutment until it latches in the stop element. In this position, the bolt protrudes in the proximal direction from the through-bore of the abutment. As an addition to the form-fit means, this protruding part of the bolt helps to position the abutment in the implant, which is already anchored in the jaw bone of the patient. A further advantage is that, with the patient in an inclined position, the abutment is fixed provisionally in the implant before final tightening.

Thereafter, the dentist tightens the bolt and fixes the abutment in the implant. During the tightening, the bolt leaves the pre-assembly position and reaches its end position. In this end position, an interference fit results between the bolt and the receiving opening of the implant.

In one embodiment of the invention, the stop element is configured as a narrowing of the inner wall of the through-bore, and the bolt, in the pre-assembly position, latches temporarily in the narrowing, until the final fixing is carried out.

In a further embodiment, the stop element is configured as a recess arranged in the inner wall, preferably as a circumferential furrow in the inner wall. The bolt has a projection which latches temporarily in the recess in the pre-assembly position.

In one embodiment of the invention, the pre-assembly position is characterized in that the first cylinder portion of the bolt extends over its entire length in the through-bore of the abutment, and the second cylinder portion protrudes from the through-bore. It is only during the final fixing that the first cylinder portion, produced with an oversize compared to the diameter of the receiving opening of the implant, is inserted into the receiving opening of the implant, such that the interference fit results.

BRIEF DESCRIPTION OF SEVERAL VIEWS OF THE DRAWINGS

The invention is explained in more detail below on the basis of illustrative embodiments and by reference to the drawing, in which.

DETAILED DESCRIPTION OF THE INVENTION

Figures 1A, 1B:
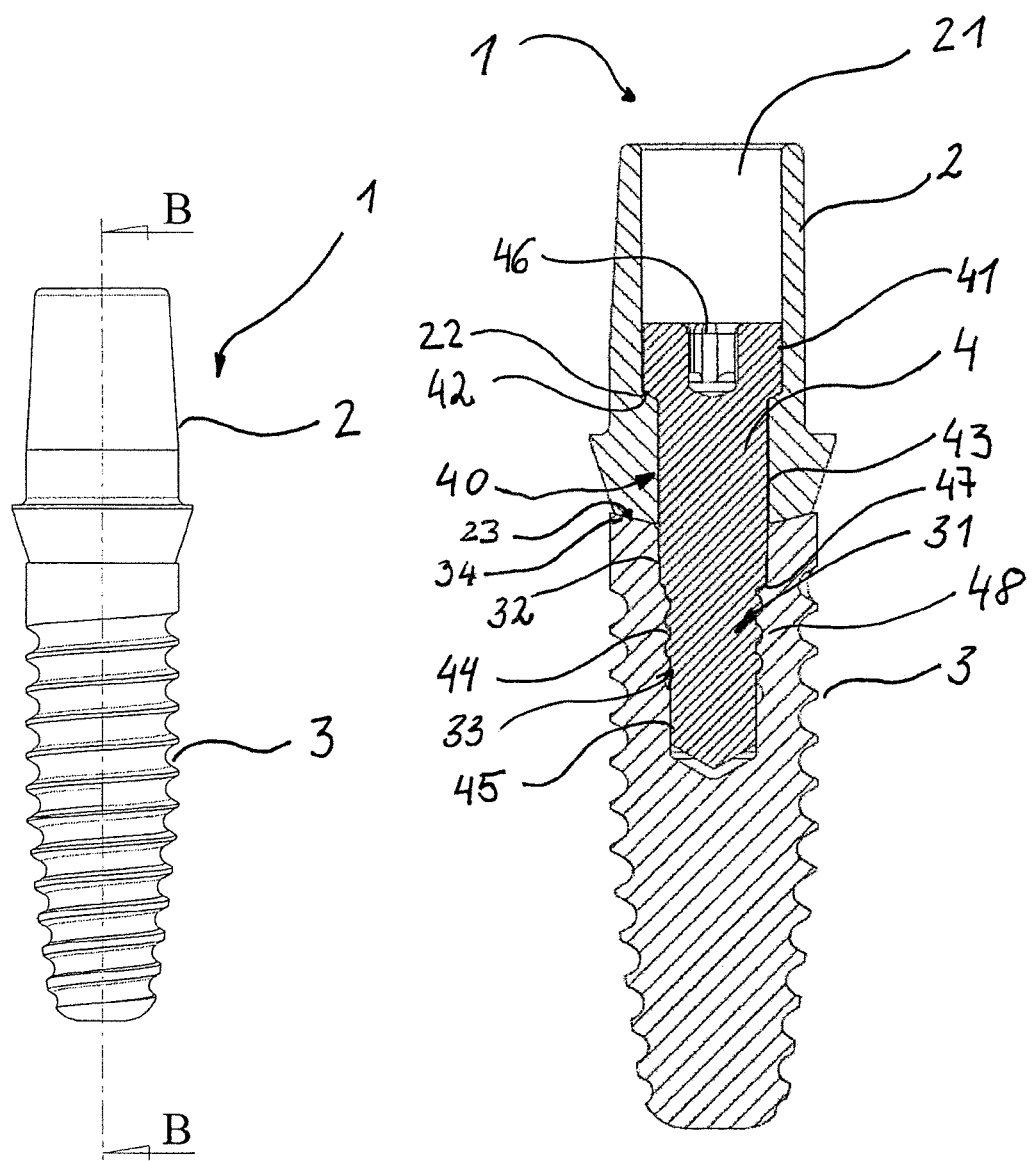
FIG. 1A shows a first embodiment of the dental prosthesis system according to the invention.
FIG. 1B shows the first embodiment from FIG. 1A in a sectional view along the axis B-B.

FIG. 1A shows a side view of a first embodiment of the dental prosthesis system 1 according to the invention, comprising an abutment 2 connected to an implant 3. The abutment 2 and the implant 3 are produced from a ceramic material, preferably zirconium oxide reinforced with aluminum oxide, or zirconium oxide reinforced with yttrium oxide. The dental prosthesis system shown is what is referred to as a bone level design. The implant 3 is configured here in such a way that, when screwed into the jaw bone, it protrudes only to a very small extent, if indeed at all, above the bone level.

FIG. 1B shows a sectional view of the embodiment from FIG. 1A along the axis B-B. The abutment 2 has a through-bore 21, and the implant 3 has a receiving opening 31. The through-bore 21 and the receiving opening 31 are configured to receive the bolt 4 and in this way to connect the abutment 2 to the implant 3 and fix it. The bolt 4 is produced from a fiber-reinforced thermoplastic, for example unidirectional carbon fibers embedded in a PEEK matrix. In the embodiment shown in FIG. 1B, the bolt 4 comprises a bolt head 41, with a recess 46 for receiving a screwing tool, and a stem 40 adjoining the head 41. At the transition between head 41 and stem 40, the bolt 4 has a first circumferential shoulder 42, which bears on a projection 22 arranged in the through-bore 21. In the present embodiment, the stem 40 comprises three contiguous cylinder portions 43, 44 and 45. The first cylinder portion 43 adjoins the head 41 and extends with one part in the through-bore 21 of the abutment and with a further part in the receiving opening 31 of the implant 3. In the embodiment shown, the second and third cylinder portions 44, 45 adjoining the first cylinder portion 43 extend only in the receiving opening 31. In the embodiment shown, the first cylinder portion 43 is designed for an interference fit, and the diameter of the first cylinder portion extending in the receiving opening 31 is at least 0.02 mm greater than the corresponding portion 32 of the receiving opening 31 of the implant. At the transition from the first cylinder portion 43 to the second cylinder portion 44, the bolt has a second circumferential shoulder 47, which bears on an internal projection in the receiving opening 31. An interference fit is formed on account of the greater diameter of the first cylinder portion 43 relative to the receiving opening 31, among other things in the bearing region between the shoulder 47 and the internal projection. The receiving opening of the implant is thereby sealed off in the proximal direction, below the shoulder 47 and the internal projection, against entry of bacteria. On its lateral surface, the second cylinder portion 44 has a circumferential outer thread 48, which corresponds to an inner thread 33 arranged in the receiving opening. Between the second cylinder portion 44 and the corresponding inner thread 33, and between the third cylinder portion 45 and the corresponding portion of the receiving opening, there is a clearance fit. To put it another way, the minimum size of the root diameter of the inner thread 33 is always greater than, or at least the same as, the maximum size of the diameter of the second cylinder portion 44. A comparable situation applies to the third cylinder portion 45. The minimum size of the diameter of the receiving opening of the implant, corresponding to the third cylinder portion 45, is always greater than, or at least the same as, the maximum size of the diameter of the third cylinder portion 45.

In the embodiment shown in FIG. 1B, the second cylinder portion 44 is adjoined by a third cylinder portion 45.

In the embodiment shown in FIG. 1B, the first cylinder portion 43 and third cylinder portion 45 have a smooth lateral surface. As can be seen clearly from the sectional view in FIG. 1B, the proximal edge 23 of the abutment bears on the distal edge 34 of the implant 3. When the bolt 4 is tightened, the proximal edge is pressed against the distal edge. The two edges each form an annular bearing surface 23, 24, which takes up axial compression forces that arise during the pretensioning of the bolt 4. The abutment 2 and implant 3 are produced from ceramic, and the bolt 4 is produced from a fiber-reinforced thermoplastic material. According to the present invention, shown by way of example in FIG. 1B, the ceramic implant and the ceramic abutment take up, at the annular bearing surfaces 23, 34, only compressive forces that arise during the tightening of the bolt 4. Bending forces that result from the mastication load are absorbed by the bolt 4. The tensile forces resulting from the bending forces are taken up by the fiber-reinforced thermoplastic material and not by the ceramic implant 3 or the abutment 2. The abutment 2 manages without an abutment stem. An anti-rotation means (not visible in FIG. 1B) is provided at the proximal edge of the abutment 2.

Figure 2A:
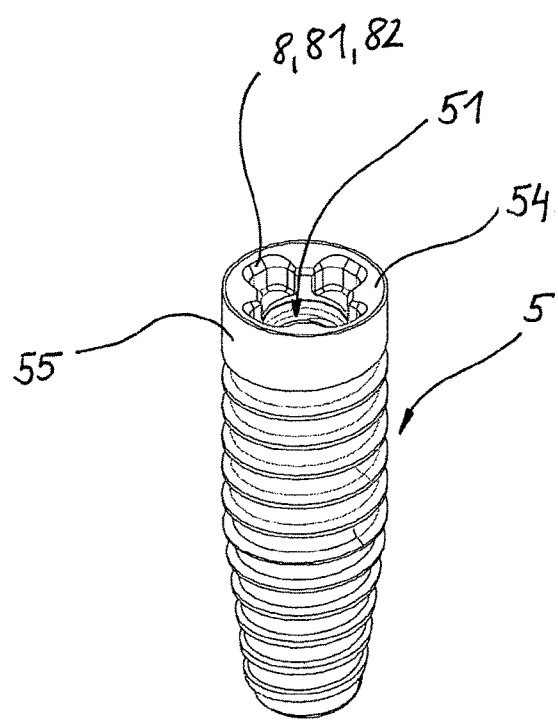
FIG. 2A shows, in a perspective view, a further embodiment of an implant with anti-rotation means for the dental prosthesis system according to the invention.
Figure 2B:
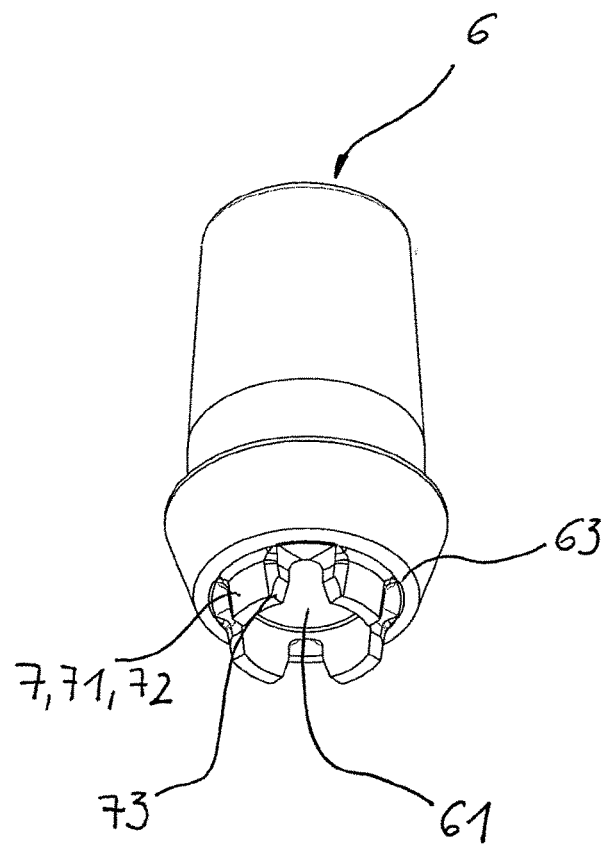
FIG. 2B shows, in a perspective view, a further embodiment of an abutment with anti-rotation means, wherein the abutment corresponds to the implant from FIG. 2A and forms an embodiment of the dental prosthesis system according to the invention.

FIGS. 2A and 2B show an illustrative embodiment of an anti-rotation arrangement as can also be used in the embodiment according to FIG. 1B. In the arrangement according to the invention, the distal edge of the implant 3, forming the bearing surface 34, can be made correspondingly wide.

FIG. 2A shows a further embodiment of an implant 5 for the dental prosthesis system according to the invention, and FIG. 2B shows an embodiment of the corresponding abutment 6. The implant 5 has a receiving opening 51, which serves to receive a bolt, for example the bolt 4 shown in FIG. 1B. An annular bearing surface 54 is formed at the distal edge of the implant 5. As can be seen from FIG. 2A, the annular bearing surface 54 is partially interrupted by second form-fit means 8 in the form of individual grooves 81. Sufficient bearing surface 54 is retained in order to ensure that the compressive forces acting on the abutment are introduced into the implant. The first form-fit means 7 of the abutment 6 shown in FIG. 2B engage in these second form-fit means 8. Each of the grooves 81 has a lengthwise groove wall 82 and two widthwise groove walls 83. The grooves extend on the inside, at the distal end of the implant in the region of the implant collar 55. The first form-fit means 7, configured as tabs 71, are correspondingly short. Their length does not exceed the width of the implant collar 55. The tabs 71 each have a lengthwise tab wall 72 and two widthwise tab walls 73.

When the abutment 6 is connected to the implant 5, the tabs 71 latch into the grooves 81. A form-fit connection results between the two widthwise groove walls 83 and the two widthwise pin walls 73, and the play between the widthwise tabs and groove walls is very small, as close as possible to zero, such that a rotationally stable fastening of the abutment in the implant is ensured. The play between the lengthwise tab walls 72 and the lengthwise groove walls 82 is in each case greater than the play between the widthwise tabs and groove walls, i.e. there is a desired distance between said walls 72 and 82. Therefore, before the bolt is inserted, the abutment is freely tiltable relative to the implant. The distance between the walls 72 and 82, and therefore a certain tiltability, is also retained when the bolt is inserted and the dental prosthesis system is mounted fixedly in the jaw of the patient. Under a flexural load, no tensile stresses act on the ceramic implant 5 and the ceramic abutment 6. As is shown, the abutment 6 is connected to the implant 5 with the aid of the bolt 4, which is inserted through the through-bore 61. A pretensioning force applied to the bolt 4 presses the bearing surface 63 against the bearing surface 54. The two ceramic parts are subjected to a compressive load. A tensile load, as occurs in addition to the compressive load during flexural loading, is not taken up by the ceramic parts but by the bolt 4 (not visible in FIGS. 2A and 2B).

In the embodiment shown in FIG. 1B and FIGS. 2A and 2B, the bearing surface 34, 54 at the distal end of the implant is formed as a flat cone and the bearing surface 23, 63 as a form-fit mating piece and therefore likewise as a flat cone.

In a further embodiment (not shown) of the dental prosthesis system according to the invention, the bearing surfaces at the distal end of the implant and at the proximal end of the abutment have a flat configuration extending in the horizontal.

Figure 3A:
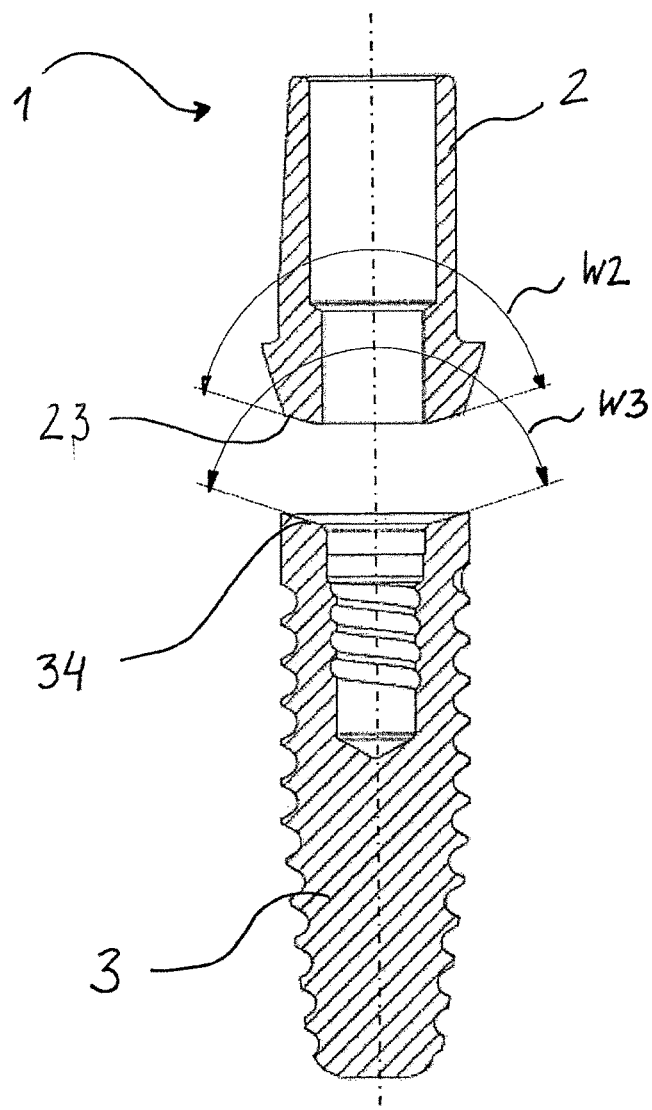
FIG. 3A shows an example of a bearing surface of the abutment and of the implant from FIG. 1, wherein abutment and implant are shown in a sectional view.

FIG. 3A shows a sectional view of the dental prosthesis system 1 from FIG. 1 comprising the implant 3 and the abutment 2. This view is intended to show in detail the angle W2 of the bearing surface 23 arranged at the proximal edge of the abutment 2 and the angle W3 of the bearing surface 34 arranged at the distal edge of the implant 3. First and second form-fit means (not visible in FIG. 3A) are arranged on the bearing surfaces 23 and 34, for example in the form of the tabs and grooves depicted in FIG. 2. The angles W2 and W3 in FIG. 3A have a value of 150°.

Figure 3B:
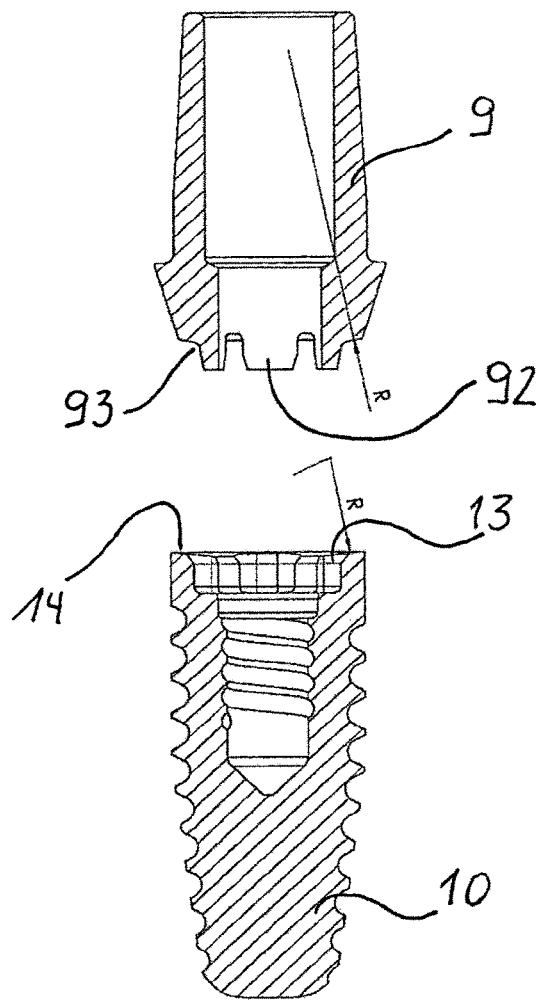
FIG. 3B shows a further embodiment of a bearing surface of the abutment and of the implant, wherein abutment and implant are shown in a sectional view.

FIG. 3A shows a further embodiment of a bearing surface 93 arranged at the proximal edge of an abutment 9 and of a bearing surface 14 arranged at the distal edge of an implant 10. The abutment 9 and the implant 10 have first form-fit means 92 and second form-fit means 13. The bearing surface 93 is configured corresponding to the bearing surface 14. Both bearing surfaces have a rounded configuration compared to the flat-cone shape from FIG. 3A and have the same radius "R". When the abutment 9 is placed onto the implant 10 and is not yet fixed with the bolt (bolt not shown in FIG. 3), it is rotationally stable on account of the first and second form-fit means 92, 13 but can be tilted relative to the implant 10.

FIG. 4 shows a sectional view of an embodiment of an abutment 6' as used in the dental prosthesis system according to the invention. The implant is not shown. The abutment 6' has a through-bore 61' with an inner wall 66. In the embodiment shown in FIG. 4, the abutment 6' is located with the inserted bolt 50 in what is called a pre-assembly position. In this position, a part of the bolt 50 protrudes in the proximal direction from the through-bore 61'. With the aid of the protruding part of the bolt, the abutment 6' is held and centered in the implant (implant not shown in FIG. 4) until it is finally fixed by the dentist. As the bolt 50 is tightened for final fixing in the implant, it leaves the pre-assembly position by means of the projection 64 being moved out of the furrow 65 (not visible in FIG. 4).

In the pre-assembly position shown, the first cylinder portion 43' extends in the through-bore 61', and parts of the second cylinder portion 44' protrude from the through-bore 61'. A recess, for example a furrow 65, is arranged on the inner wall 66. A projection 64 provided on the bolt 50, preferably on the head 41', latches temporarily into the furrow 65 in the pre-assembly position. The projection 64 and the furrow 65 form a stop element which temporarily holds the bolt in a pre-assembly position.

Figures 4A, 4B:
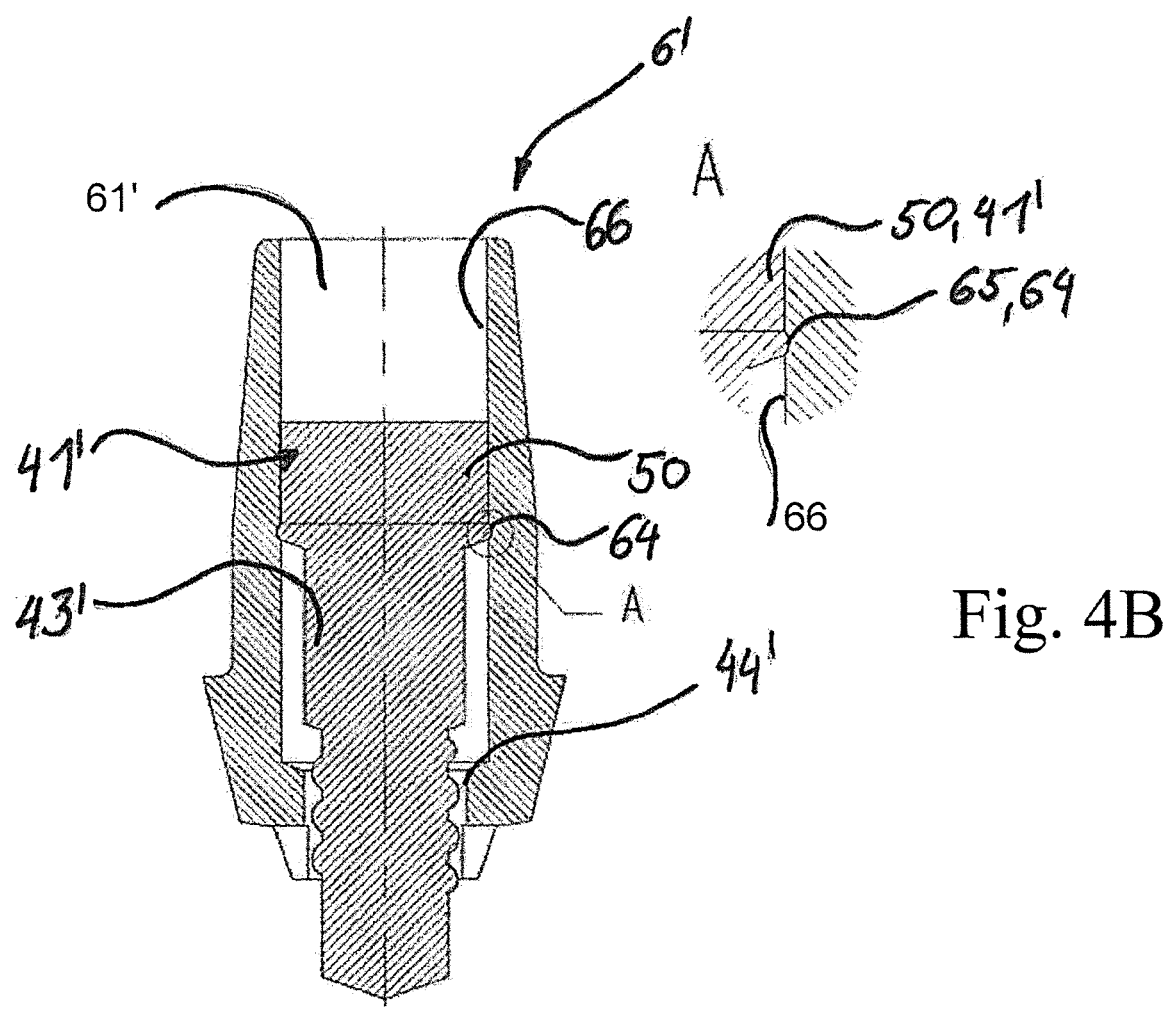
FIG. 4A shows a further embodiment of an abutment with a stop element, with the abutment depicted in a pre-assembly position.
FIG. 4B shows a detail of the bolt and of the inner wall of the abutment.

FIG. 4B shows a detail A of this position, wherein the bolt 50 at the head 41 has a projection 64 which engages in a recess configured as furrow 65.

The invention claimed is:

1. A dental prosthesis system (1) made of ceramic, comprising:
   an implant (3) for osseointegration in a jaw bone and having a receiving opening (31), wherein a distal end of the implant (3) includes an implant bearing surface,
   an abutment (2) having a through-bore (21), wherein a proximal end of the abutment (2) includes an abutment bearing surface,
   a bolt comprising a fiber-reinforced thermoplastic and being configured to connect the abutment (2) and the implant (3), the bolt including a bolt head (41) and a first cylinder portion (43) extending from the bolt head (41), and
   an anti-rotation arrangement, the anti-rotation arrangement comprising:
      a plurality of tabs (71) arranged at the proximal end of the abutment (2) and projecting from the abutment bearing surface, each of the tabs (71) including an outer facing lengthwise tab wall (72) between two widthwise tab walls (73), and
      a plurality of grooves (81) arranged at the distal end of the implant (3) and within the implant bearing surface (54) of the implant (3), each of the grooves includes a lengthwise groove wall (82) and two widthwise groove walls (83),
   wherein when the plurality of tabs (71) engages in the plurality of grooves (81), a full longitudinal wall length of a surface of the lengthwise tab wall (72) of each of the plurality of tabs (71) is spaced apart from an entire surface of a corresponding lengthwise groove wall (82) of the plurality of grooves (81), such that the abutment, without an inserted bolt (4), is tiltable relative to the implant, and, with the bolt (4) inserted, the first cylinder portion (43) of the bolt extends in the through-bore (21) of the abutment (2) and the receiving opening (31) of the implant (3), and an interference fit is provided as a connection of the first cylinder portion (43) of the bolt (4) to a corresponding portion (32) of the receiving opening (31) of the implant (3);
   wherein the implant bearing surface and the abutment bearing surface touch each other when the plurality of tabs (71) engages in the plurality of grooves (81), and the plurality of tabs (71) is spaced apart from the plurality of grooves (81) at the distance along the full longitudinal wall length, whereby with the bolt (4) inserted and the dental prosthesis system mounted in the jaw bone and under a flexural load, tensile stresses act upon the bolt (4) due to the interference fit and not on the implant (3) and the abutment (2).

2. The dental prosthesis system as claimed in claim 1, wherein each of the implant and abutment bearing surfaces (63, 54, 23, 34) has a cone design, inclined at a uniform angle (W2, W3).

3. The dental prosthesis system as claimed in claim 1, wherein each of the implant and abutment bearing surfaces (63, 54, 23, 34) has a rounded configuration in a contact region, wherein each radius of the implant and abutment bearing surfaces (63, 54, 23, 34) has a same value.

4. The dental prosthesis system as claimed in claim 1, wherein a diameter of the first cylinder portion (43) is greater than a diameter of the corresponding portion (32) of the receiving opening of the implant, such that the interference fit results between the first cylinder portion (43) and the receiving opening (31) of the implant (3), and the bolt head (41) has a bolt head diameter that is greater than the diameter of first cylinder portion (43).

5. The dental prosthesis system as claimed in claim 4, wherein the bolt (4) has a second cylinder portion (44) adjoining the first cylinder portion, and at a transition between the first and the second cylinder portion (44), a circumferential shoulder (47) is provided which bears on a circumferential projection within the receiving opening (31) of the implant, wherein a further interference fit results between the shoulder (47) and the circumferential projection.

6. The dental prosthesis system as claimed in claim 5, wherein the second cylinder portion (44) has, on a lateral surface, an outer thread (48) which corresponds to an inner thread (33) arranged in the receiving opening (31), wherein a root diameter of the outer thread (48) is smaller than or the same as a root diameter of the inner thread (33).

7. The dental prosthesis system as claimed in claim 6, wherein the second cylinder portion (44) is adjoined by a further, third cylinder portion (45), wherein a diameter of the third cylinder portion is smaller than or the same as the diameter of the receiving opening (31) of the implant (3).

8. The dental prosthesis system as claimed in claim 1, wherein the distance between the lengthwise tab wall (72) and the corresponding lengthwise groove wall (82) is greater than a second distance between the widthwise tab walls (73) and the widthwise groove walls (83), such that the abutment (2) is positioned in a rotationally stable manner in the implant (3) and is tiltable relative to the implant (3).

9. The dental prosthesis system as claimed in claim 1, wherein the number of tabs (71) is less than the number of grooves (81), forming a form-fit connection.

10. The dental prosthesis system as claimed in claim 1, wherein the fiber-reinforced thermoplastic has reinforcement fibers chosen from a group consisting of: carbon fiber, aramid fiber, glass fiber, carbon nanotubes, or combinations thereof.

11. The dental prosthesis system as claimed in claim 1, wherein the fiber-reinforced thermoplastic comprises unidirectional carbon fibers in a PEEK matrix.

12. The dental prosthesis system as claimed in claim 1, wherein a stop element (64, 65) is arranged on the bolt (50) and/or on an inner wall (66) of the through-bore (21) of the abutment, and the bolt (50) latches temporarily in the stop element (64, 65) in a pre-assembly position prior to connecting to the implant (3).

13. The dental prosthesis as claimed in claim 12, wherein in the pre-assembly position, an entire length of the first cylinder portion (43') of the bolt (4) is within the through-bore (21) of the abutment (2), and the second cylinder portion (44') protrudes from the through-bore.

14. The dental prosthesis system as claimed in claim 1, further comprising a stop element (64, 65) arranged on the bolt (50) and/or on an inner wall (66) of the through-bore (21) of the abutment, wherein the bolt (50) latches temporarily in the stop element (64, 65) in a pre-assembly position.

15. The dental prosthesis system as claimed in claim 1, wherein the abutment bearing surface is inclined between an outer surface of the abutment (2) and the plurality of tabs (71) at a first angle (W2), the implant bearing surface is inclined between an outer surface of the implant (3) and the plurality of grooves (81) at a second angle (W3), and the first angle (W2) and the second angle (W3) are uniform.

\* \* \* \* \*